(12) United States Patent
Gao et al.

(10) Patent No.: US 11,527,892 B2
(45) Date of Patent: Dec. 13, 2022

(54) PHOTOVOLTAIC POWER GENERATION CONTROL METHOD AND PHOTOVOLTAIC POWER GENERATION SYSTEM

(71) Applicant: HUAWEI DIGITAL POWER TECHNOLOGIES CO., LTD., Shenzhen (CN)

(72) Inventors: Yongbing Gao, Shanghai (CN); Guilei Gu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/748,071

(22) Filed: Jan. 21, 2020

(65) Prior Publication Data

US 2020/0159269 A1 May 21, 2020

Related U.S. Application Data

(63) Continuation of application No. PCT/CN2018/096756, filed on Jul. 24, 2018.

(30) Foreign Application Priority Data

Jul. 28, 2017 (CN) .......................... 201710633242.8

(51) Int. Cl.
*H02J 3/38* (2006.01)
*H02S 40/32* (2014.01)
*G05F 1/67* (2006.01)

(52) U.S. Cl.
CPC ................ *H02J 3/381* (2013.01); *G05F 1/67* (2013.01); *H02S 40/32* (2014.12); *H02J 2300/26* (2020.01)

(58) Field of Classification Search
CPC ........ H02J 1/00; H02J 9/00; H02J 3/38; H02J 3/383; H02J 3/385; H02J 3/386;
(Continued)

(56) References Cited

U.S. PATENT DOCUMENTS 9,442,504 B2 9/2016 Porter et al.
2003/0076149 A1* 4/2003 Haga .................... G09G 3/3688
327/333

(Continued)

FOREIGN PATENT DOCUMENTS

CN 104242351 A 12/2014
CN 106877311 A 6/2017
(Continued)

OTHER PUBLICATIONS

International Search Report issued in PCT/CN2018/096756 dated Sep. 25, 2018 (4 pages).

(Continued)

*Primary Examiner* — Toan T Vu
*Assistant Examiner* — Thai H Tran (57) ABSTRACT

Embodiments of this application disclose a control method for a photovoltaic power generation system and a photovoltaic power generation system, to reduce a photovoltaic energy loss. The method includes: presetting, by the photovoltaic power generation system, an upper limit value for each converter in the photovoltaic power generation system, where the upper limit value is a maximum voltage value of an output voltage to ground of the converter, and the output voltage to ground is a voltage difference between a positive output end of the converter and a ground point of the photovoltaic power generation system; and limiting, by the photovoltaic power generation system, an output voltage to ground of a target converter based on an upper limit value corresponding to the target converter, where the target (Continued)

converter may be any converter in the photovoltaic power generation system.

15 Claims, 5 Drawing Sheets

(58) Field of Classification Search
CPC ..... H01L 31/02; H01L 31/02021; H03K 3/00; G05F 1/67; H02S 40/36; H02S 40/34; H02S 40/32
USPC ................ 307/82, 43, 77, 66, 64, 9.1, 10.1; 323/311; 327/109; 363/95
See application file for complete search history.

(56) References Cited

U.S. PATENT DOCUMENTS

| | | | | |
|---|---|---|---|---|
| 2011/0121652 A1* | 5/2011 | Sella | ............... | H02J 1/102 307/43 |
| 2012/0161526 A1* | 6/2012 | Huang | ............... | G05F 1/67 307/77 |
| 2012/0175963 A1* | 7/2012 | Adest | ............... | H02M 7/42 307/82 |
| 2012/0223583 A1* | 9/2012 | Cooley | ............... | H02J 3/385 307/82 |
| 2014/0159763 A1 | 6/2014 | Luo et al. | | |
| 2014/0265595 A1* | 9/2014 | Cheng | ............... | H02J 9/00 307/66 |
| 2014/0312700 A1* | 10/2014 | Catthoor | ............... | G05F 1/67 307/77 |
| 2014/0319918 A1 | 10/2014 | Siri | | |
| 2015/0130284 A1* | 5/2015 | Ledenev | ............... | H02J 1/102 307/82 |
| 2017/0077869 A1* | 3/2017 | Catthoor | ............... | H02J 3/38 |

FOREIGN PATENT DOCUMENTS

| | | |
|---|---|---|
| CN | 107528340 A | 12/2017 |
| EP | 3629439 A1 | 4/2020 |

OTHER PUBLICATIONS

Extended European search report EP Application 18 83 8910 dated Jun. 19, 2020, 7 pages.

* cited by examiner

A photovoltaic power generation system presets an upper limit value for each optimizer in the photovoltaic power generation system — 401

The photovoltaic power generation system limits an output voltage to ground of a target optimizer based on an upper limit value corresponding to the target converter — 402

PHOTOVOLTAIC POWER GENERATION CONTROL METHOD AND PHOTOVOLTAIC POWER GENERATION SYSTEM

CROSS-REFERENCE TO RELATED APPLICATIONS

This application is a continuation of International Application No. PCT/CN2018/096756, filed on Jul. 24, 2018, which claims priority to Chinese Patent Application No. 201710633242.8, filed on Jul. 28, 2017. The disclosures of the aforementioned applications are hereby incorporated by reference in their entireties.

TECHNICAL FIELD

This application relates to the field of photovoltaic power generation, and in particular, to a photovoltaic power generation control method and a photovoltaic power generation system.

BACKGROUND

In a photovoltaic power generation system using optimizers and a distributed maximum power point tracking (MPPT) technology, a measure needs to be taken to ensure that a sum (which is referred to as a BUS voltage for short) of output voltages of all the optimizers in the photovoltaic power generation system is always less than a system voltage to ensure that the photovoltaic power generation system can normally work in any scenario. When an output voltage of an optimizer is less than an output voltage upper limit value, the optimizer works in an MPPT state, and no photovoltaic energy loss occurs. When an output voltage of an optimizer is greater than or equal to an output voltage upper limit value, the optimizer works in a power limited state, and a photovoltaic energy loss occurs. In this case, the photovoltaic power generation system needs to adjust the output voltage upper limit value of the optimizer, to make the optimizer return from the power limited state to the MPPT state.

An existing assurance measure is setting a BUS voltage upper limit value. The BUS voltage upper limit value ranges between a normal working voltage and the system voltage. For example, if the normal working voltage is 400 V and the system voltage is 600 V, the BUS voltage upper limit value may be 110% of the normal working voltage, namely, 440 V. Assuming that a single photovoltaic string includes eight optimizers connected in series, a normal output voltage of each optimizer is 50 V, and an output voltage upper limit value is 55 V.

In the existing assurance measure, a BUS voltage upper limit value is set for a photovoltaic string. Because all optimizers in a single photovoltaic string are connected in series, and a BUS voltage is equivalent to a sum of output voltages of all the optimizers, a sum of output voltage upper limit values of all the optimizers is equivalent to the BUS voltage upper limit value. In other words, a voltage headroom between a normal working voltage and the output voltage upper limit value of each optimizer is relatively small, for example, 5 V. In addition, when the BUS voltage upper limit value remains unchanged, the foregoing voltage headroom value of each optimizer decreases as the quantity of optimizers is increased. When a photovoltaic component corresponding to an optimizer is blocked, output voltages of some optimizers reach output voltage upper limit values because the voltage headroom of each optimizer is relatively small. Consequently, some optimizers work in the power limited state, causing a photovoltaic energy loss. In this case, the photovoltaic power generation system needs to increase the output voltage upper limit values of the optimizers, in order to make the converters exit the power limited state and enter the MPPT state to work.

SUMMARY

Embodiments of this application provide a photovoltaic power generation control method and a photovoltaic power generation system, to reduce a photovoltaic energy loss in the photovoltaic power generation system.

According to a first aspect, an embodiment of this application provides a photovoltaic power generation control method. The method is applied to a photovoltaic power generation system. The photovoltaic power generation system includes at least one photovoltaic string. Each photovoltaic string includes at least one photovoltaic module. Each photovoltaic module includes a photovoltaic unit and a converter (also referred to as an optimizer). The photovoltaic unit and the converter in each photovoltaic module are connected. That is, an output end of the photovoltaic unit is connected to an input end of the converter. In addition, converters in a same photovoltaic string are connected in series. That is, output ends of the converters are connected in series. The method includes the following.

First, the photovoltaic power generation system sets an upper limit value for each converter in the photovoltaic power generation system. In other words, the photovoltaic power generation system sets upper limit values for all the converters in the system. The upper limit value is a maximum voltage value of an output voltage to ground of the converter, and the output voltage to ground is a voltage difference between a positive output end of the converter and a ground point of the photovoltaic power generation system. It should be understood that, the upper limit value is not an output voltage upper limit value. Then, the photovoltaic power generation system limits an output voltage to ground of a target converter based on an upper limit value corresponding to the target converter. The target converter is any converter in the photovoltaic power generation system. In other words, the photovoltaic power generation system limits the output voltage to ground of each converter based on the upper limit value corresponding to the converter.

This embodiment of this application has the following advantages.

In this application, the photovoltaic power generation system sets an upper limit value corresponding to the output voltage to ground for each converter in the system, and the photovoltaic power generation control system limits an output voltage to ground of a converter based on an upper limit value corresponding to the output voltage to ground of the converter. It should be understood that, the output voltage to ground is not an output voltage. Because output ends of the converters are connected in series, an output voltage to ground of a converter is related to both an output voltage of the converter and an output voltage to ground of another converter in a same photovoltaic string. A BUS voltage is a sum of output voltages of converters in a same photovoltaic string. In other words, an output voltage to ground can directly reflect the BUS voltage, but an output voltage cannot directly reflect the BUS voltage. If a corresponding upper limit value is set for the output voltage to ground of the converter, a maximum value of an output voltage upper limit value of each converter can reach a BUS voltage upper limit value of the photovoltaic string. The optimizer can obtain a larger voltage headroom after the output voltage to ground is set, so that in an abnormal scenario in which a photovoltaic component is blocked, each optimizer in the photovoltaic power generation system can work in an MPPT state. Therefore, the control method for a photovoltaic power generation system in this application can effectively reduce a photovoltaic energy loss in the photovoltaic power generation system.

With reference to the first aspect of the embodiments of this application, in a first implementation of the first aspect of the embodiments of this application, the upper limit value corresponding to the target converter is set by the target converter.

With reference to the first aspect of the embodiments of this application, in a second implementation of the first aspect of the embodiments of this application, the photovoltaic power generation system further includes a control device, and the upper limit value corresponding to the target converter is centrally set by the control device.

With reference to the second implementation of the first aspect of the embodiments of this application, in a third implementation of the first aspect of the embodiments of this application, the control device includes an inverter.

With reference to the first aspect of the embodiments of this application, the first implementation of the first aspect of the embodiments of this application, or the second implementation of the first aspect of the embodiments of this application, in a fourth implementation of the first aspect of the embodiments of this application, the output voltage to ground upper limit value corresponding to the target converter may be calculated by using a gradient method and/or a maximum method. Alternatively, another method or a combination of other methods may be used to set the output voltage to ground of the converter. No limitation is imposed in this application.

With reference to the first aspect of the embodiments of this application, in a fifth implementation of the first aspect of the embodiments of this application, the limiting, by the photovoltaic power generation system, an output voltage to ground of a target converter based on an output voltage to ground upper limit value corresponding to the target converter includes: when the output voltage to ground of the target converter is greater than the output voltage to ground upper limit value of the target converter, limiting, by the photovoltaic power generation system, the output voltage to ground of the target converter to the output voltage to ground upper limit value of the target converter.

With reference to any one of the first aspect of the embodiments of this application, or the first implementation of the first aspect to the fifth implementation of the first aspect of the embodiments of this application, in a sixth implementation of the first aspect of the embodiments of this application, the converter is a direct current/direct current converter, and a topology of the converter includes: a buck buck topology, a boost topology, a buck-boost topology, or a boost-buck topology.

With reference to any one of the first aspect of the embodiments of this application, or the first implementation of the first aspect to the sixth implementation of the first aspect of the embodiments of this application, in a seventh implementation of the first aspect of the embodiments of this application, the converter includes an isolated converter or a non-isolated converter.

According to a second aspect, an embodiment of this application provides a photovoltaic power generation system, where the photovoltaic power generation system includes at least one photovoltaic string, each photovoltaic string includes at least one photovoltaic module, each photovoltaic module includes a photovoltaic unit and a converter, the photovoltaic unit and the converter in each photovoltaic module are connected, converters in a same photovoltaic string are connected in series, and the photovoltaic power generation system is configured to perform the operations according to the first aspect or the first implementation of the first aspect.

Related descriptions of beneficial effects of the second aspect are similar to descriptions of beneficial effects of the first aspect. For details, refer to the related descriptions in the first aspect.

With reference to the second aspect of the embodiments of this application, in a first implementation of the second aspect of the embodiments of this application, each photovoltaic unit includes at least one photovoltaic component, and a connection relationship between photovoltaic components in the at least one photovoltaic component is not limited.

With reference to the second aspect of the embodiments of this application, in a second implementation of the second aspect of the embodiments of this application, the photovoltaic power generation system further includes a control device, and the photovoltaic power generation system is configured to perform the operations according to any one of the second implementation of the first aspect to the seventh implementation of the first aspect.

According to a third aspect, an embodiment of this application provides a converter, where the converter includes a voltage to ground sampling circuit, the voltage to ground sampling circuit is located at an output end of the converter, and the voltage to ground sampling circuit is configured to collect a voltage to ground of a positive output end of the converter or a negative output end of the converter.

DESCRIPTION OF EMBODIMENTS

Embodiments of this application provide a photovoltaic power generation control method and a photovoltaic power generation system, to reduce a photovoltaic energy loss in the photovoltaic power generation system.

In the specification, claims, and accompanying drawings of this application, the terms "first", "second", "third", "fourth", and the like (if existent) are intended to distinguish between similar objects but do not necessarily indicate a specific order or sequence. It should be understood that, the data used in such a way is interchangeable in proper circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

To help understand the embodiments of this application, a photovoltaic power generation system and a control method for a photovoltaic power generation system and a specific application scenario of the control method are successively described below in detail. In addition, it should be noted that an optimizer mentioned in the following embodiments is a converter.

First, the photovoltaic power generation system in the embodiments of this application is described as follows.

Figure 1:
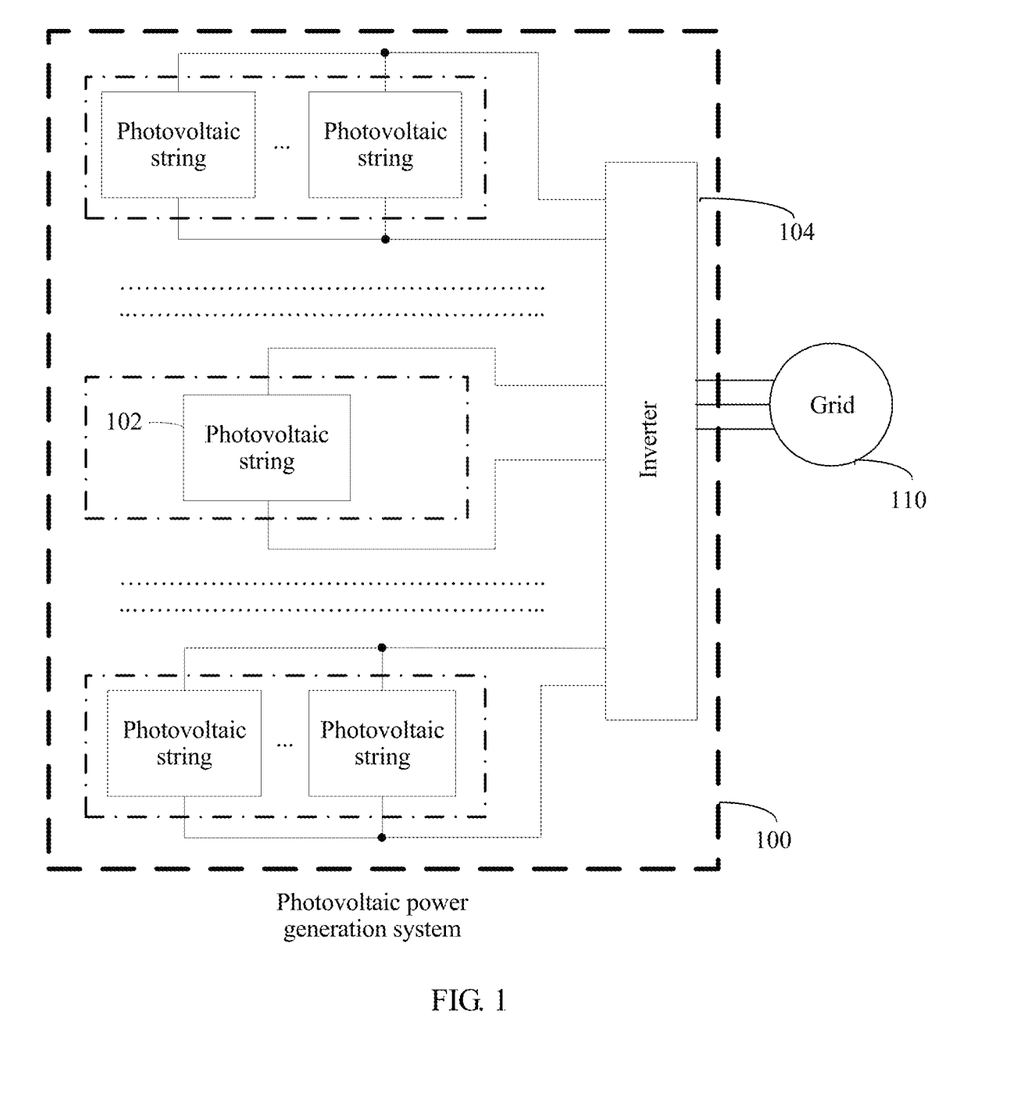
FIG. 1 is a schematic diagram of an application scenario of a photovoltaic power generation system according to an embodiment of this application.

FIG. 1 is a schematic diagram of an application scenario of a photovoltaic power generation system according to an embodiment of this application. The photovoltaic power generation system 100 includes at least one photovoltaic string 102, and an inverter 104, and may be connected to a grid 110. Example connection relationships in the system 100 are shown in FIG. 1. A photovoltaic string 102 may be connected in parallel to another photovoltaic string 102 and then connected to the inverter 104, or may be independently connected to the inverter. In addition, the inverter has a plurality of photovoltaic string 102 input ends. Output of the photovoltaic string is connected to the input end of the inverter 104. A voltage of the input end of the inverter is referred to as a BUS voltage. An output end of the inverter 104 is connected to the grid. The inverter 104 implements direct current/alternating current conversion, to convert a direct current into an alternating current and output the alternating current to the grid. In this application scenario, the inverter 104 manages all optimizers 208 in the photovoltaic string together, and a communication manner is power line carrier communication. In this case, an upper limit value corresponding to a voltage to ground of the optimizer may be set by the optimizer 208, or may be set by the inverter 104. No limitation is imposed in this application. It may be understood that in this application scenario, the inverter has a function of a control device.

Figure 2:
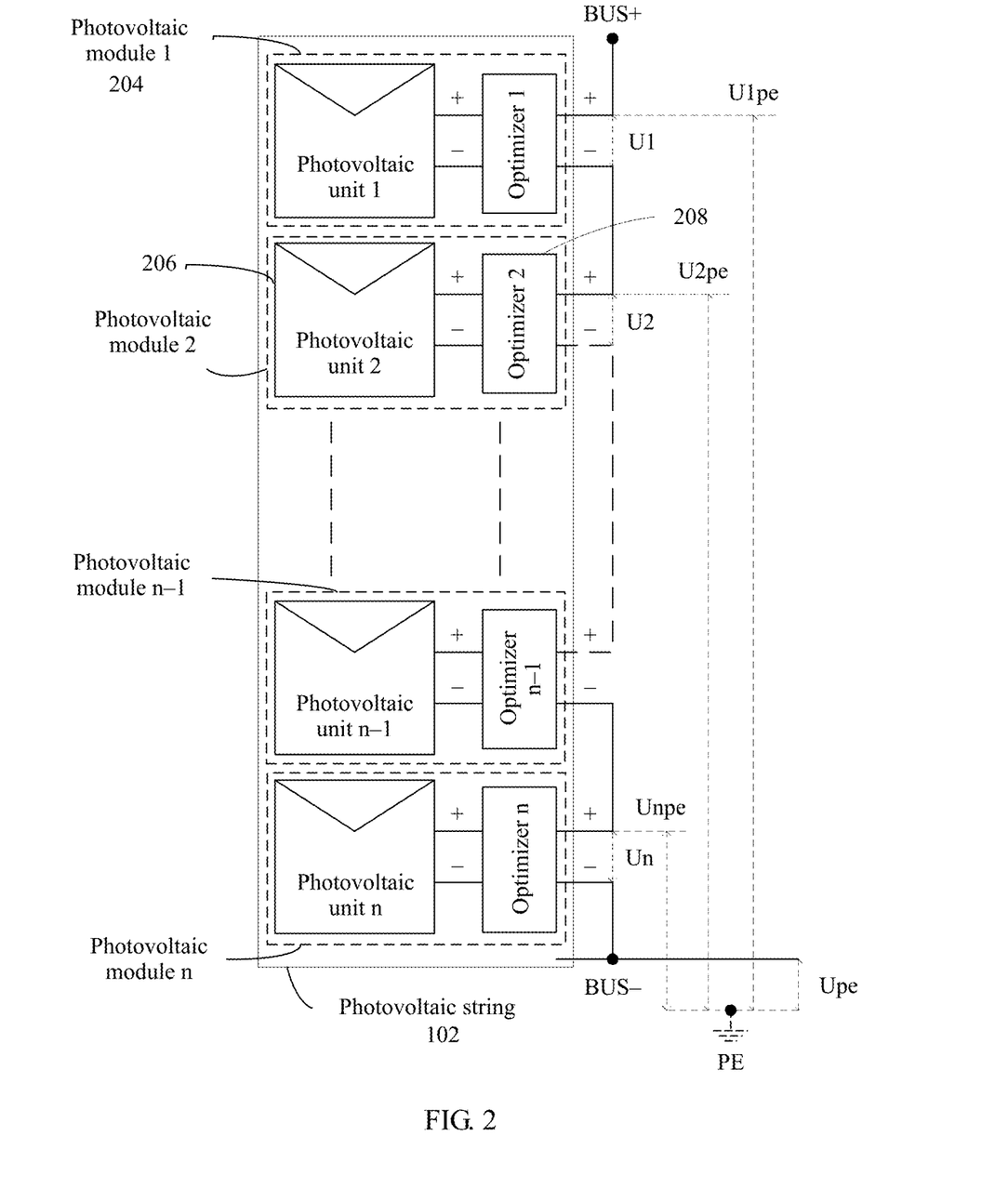
FIG. 2 is a schematic structural diagram of a photovoltaic string in a photovoltaic power generation system.

FIG. 2 is a schematic structural diagram of a photovoltaic string in the photovoltaic power generation system 100. Each photovoltaic string 102 includes n photovoltaic modules 204 (e.g., a photovoltaic module 1, . . . , and a photovoltaic module n), where n is a positive integer greater than or equal to 2. A typical value of n is a positive integer ranging from 5 to 25. In other words, a typical quantity of photovoltaic modules connected in series is 5 to 25. However, embodiments are not limited thereto. Each photovoltaic module 204 includes a photovoltaic unit 206 and an optimizer 208. As shown in FIG. 2, a photovoltaic module 1 includes a photovoltaic unit 1 and an optimizer 1, a photovoltaic module 2 includes a photovoltaic unit 2 and an optimizer 2, . . . , a photovoltaic module n−1 includes a photovoltaic unit n−1 and an optimizer n−1, and a photovoltaic module n includes a photovoltaic unit n and an optimizer n. The photovoltaic unit 206 includes at least one photovoltaic component, and the photovoltaic unit 206 is connected to a respective optimizer 208. Output ends of all optimizers 208 in the photovoltaic string 102 are connected in series. That is, a positive output end of an optimizer is connected to a negative output end of a previous optimizer, and a negative output end of the optimizer is connected to a positive output end of a next optimizer. For example, as shown in FIG. 1, a negative output end of the optimizer 1 is connected to a positive output end of the optimizer 2, a negative output end of the optimizer 2 is connected to a positive output end of the optimizer 3, and all the optimizers 208 are successively connected according to this rule.

In addition, in FIG. 2, it should be noted that, U1 to Un are respective output voltages of all the optimizers. U1$pe$ to Un$pe$ are respective output voltages to ground of all the optimizers. Upe is a negative BUS voltage to ground, and PE is a ground point of the photovoltaic power generation system and is used as a reference point of each voltage to ground. In addition, each optimizer may collect an output voltage to ground corresponding to the optimizer. The output voltage to ground is a voltage difference between a positive output end of the optimizer and the ground point of the photovoltaic power generation system.

It should further be noted that, in the photovoltaic power generation system in this application, quantities of photovoltaic modules connected in series in photovoltaic strings may be different; powers of photovoltaic units may be different, including a power difference caused by different quantities of photovoltaic components, different serial or parallel connection manners, different models, or an external factor, for example, a photovoltaic component is lighted or blocked; and a photovoltaic unit or an optimizer may be removed due to a fault or added after recovery from a fault.

Figure 3:
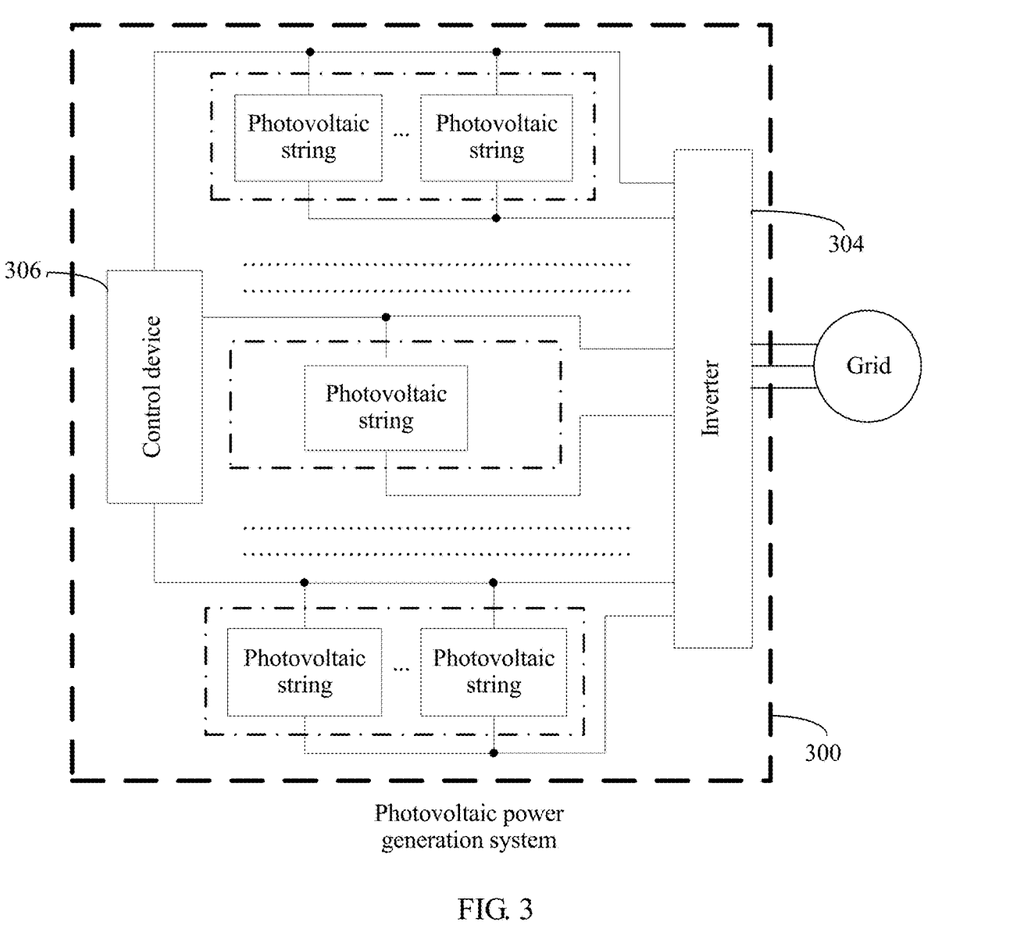
FIG. 3 is a schematic diagram of another application scenario of a photovoltaic power generation system according to an embodiment of this application.

FIG. 3 is a schematic diagram of another application scenario of a photovoltaic power generation system according to this application. In the application scenario shown in FIG. 3, the photovoltaic power generation system 300 has an independent control device 306. Therefore, the control device 306 instead of an inverter 304 manages all photovoltaic strings 102 together. Similarly, in this case, an upper limit value corresponding to a voltage to ground of an optimizer may be set by the optimizer, or may be set by the control device 306.

In addition, for related descriptions of FIG. 3, refer to the related descriptions of FIG. 1.

Figure 4:
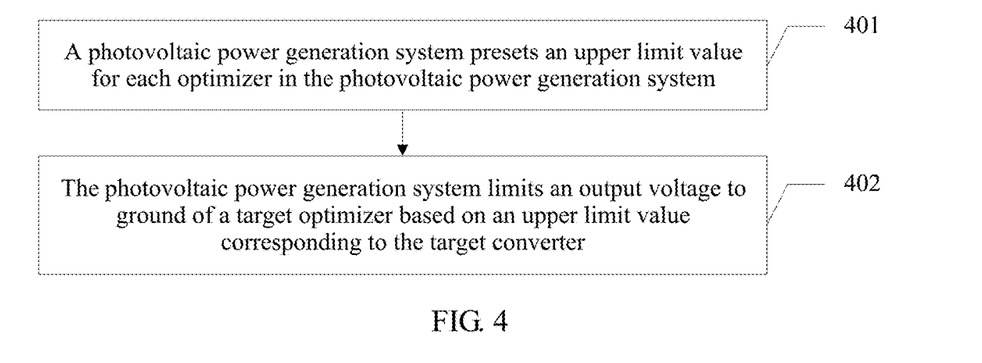
FIG. 4 is a schematic diagram of an embodiment of a control method for a photovoltaic power generation system according to an embodiment of this application.

Second, FIG. 4 is a schematic diagram of an embodiment of a control method for a photovoltaic power generation system according to an embodiment of this application. As shown in FIG. 4, the control method for a photovoltaic power generation system in this embodiment is specifically described as follows.

At step 401 a photovoltaic power generation system presets an upper limit value for each optimizer in the photovoltaic power generation system.

In this embodiment, the photovoltaic power generation system sets an upper limit value for each optimizer in the photovoltaic power generation system. The upper limit value is a maximum voltage value of an output voltage to ground of the optimizer. In other words, the output voltage to ground of the optimizer is less than or equal to the upper limit value. Thus, the output voltage to ground of the optimizer is a voltage difference between a positive output end of the optimizer and a ground point (e.g., the foregoing PE) of the photovoltaic power generation system. It may be understood that in this step, upper limit values are set for output voltages to ground of all the optimizers in the photovoltaic system. For example, in the system shown in FIG. 2, the output voltages to ground of the optimizers are respectively U1$pe$ to Un$pe$.

In some embodiments of this application, the optimizer may first collect a voltage difference between a negative output end of the optimizer and the ground point of the photovoltaic power generation system, and then perform addition calculation based on the collected voltage difference and an output voltage of the optimizer, to obtain the output voltage to ground of the optimizer. In addition, in some embodiments, the optimizer may directly collect the voltage difference between the positive output end of the optimizer and the ground point of the photovoltaic power generation system, to obtain the output voltage to ground.

In addition, for an entity that sets the output voltage to ground of the optimizer, the following application scenarios may exist.

Optionally, in a possible application scenario, the optimizer in the photovoltaic power generation system sets the output voltage to ground of the optimizer.

Optionally, in another possible application scenario, for example, in the application scenario shown in FIG. 1, the photovoltaic power generation system further includes an inverter. In this case, the upper limit value of the output voltage to ground of the optimizer may be set by the optimizer, or may be set by the inverter. No limitation is imposed in this application. For related descriptions, refer to the descriptions corresponding to FIG. 1.

Optionally, in still another possible application scenario, for example, in the application scenario shown in FIG. 3, the photovoltaic power generation system further includes an inverter and a control device. In this case, the upper limit value of the output voltage to ground of the optimizer may be set by the optimizer or the control device. No limitation is imposed in this application. For related descriptions, refer to the descriptions corresponding to FIG. 3.

In some embodiments. the optimizer is essentially a direct current/direct current converter, and may be isolated or non-isolated. The topology of the optimizer is not limited either, and may be any one of a buck-buck topology, a boost topology, a buck-boost topology, or a boost-buck topology, or may be a combination of at least two of the topologies.

Further, a method for setting the output voltage to ground upper limit value of the optimizer may be as follows.

Optionally, in a possible setting technique, the voltage to ground upper limit value of the optimizer may be set by using a gradient method. In the gradient method, different output voltage to ground upper limit values are set based on physical locations of all the optimizers, and there is a sufficiently large headroom between an actual output voltage to ground value and the output voltage to ground upper limit value of each optimizer. The system described in the background is used as an example. A typical value may be 40 V. It should be noted however that, different systems may have different typical values in an actual application scenario, depending on the actual use case. For detailed descriptions of the gradient method, refer to related descriptions in specific application scenarios corresponding to FIG. 5 and FIG. 6.

Optionally, in another possible setting technique, the voltage to ground upper limit value of the optimizer may be set by using a maximum method. In the maximum method, there is no need to know a physical location of each optimizer. In the method, output voltage to ground upper limit values of all the optimizers are set to a maximum value, and a headroom between an actual output voltage to ground value and the output voltage to ground upper limit value of each optimizer falls within a preset range, for example, 40 V to 390 V. For detailed descriptions of the maximum method, refer to related descriptions in specific application scenarios corresponding to FIG. 5 and FIG. 6. The, "40 V to 390 V" herein is also given merely in relation to the system described in the background as an example, and no limitation is imposed on embodiments.

It should be noted that, the method for setting the output voltage to ground upper limit value of the optimizer may be another method that can achieve same technical effects, or may be a combination of a plurality of methods.

At step 402, the photovoltaic power generation system limits an output voltage to ground of a target optimizer based on an upper limit value corresponding to the target optimizer.

In this embodiment, the photovoltaic power generation system limits the output voltage to ground of the target optimizer based on the output voltage to ground upper limit value corresponding to the target optimizer. The target optimizer may be any optimizer in the photovoltaic power generation system. The target optimizer in the photovoltaic power generation system limits the output voltage to ground of the target optimizer based on the output voltage to ground upper limit value corresponding to the target optimizer.

Optionally, in a possible implementation, if the output voltage to ground of the target optimizer is greater than the output voltage to ground upper limit value corresponding to the target optimizer, the target optimizer limits the output voltage to ground of the target optimizer to the output voltage to ground upper limit value of the target optimizer.

In addition, it should be noted that, the optimizer in this embodiment of this application includes a voltage to ground sampling circuit, and the voltage to ground sampling circuit has a function of collecting the voltage difference between the output end of the optimizer and the ground point of the photovoltaic power generation system. The optimizer having a voltage to ground collection function provides important hardware support for implementing the control method for a photovoltaic power generation system in this application.

In this embodiment, the photovoltaic power generation system sets an upper limit value corresponding to the output voltage to ground for each converter in the system, and the photovoltaic power generation control system limits an output voltage to ground of a converter based on an upper limit value corresponding to the output voltage to ground of the converter. It should be understood that, the output voltage to ground is not an output voltage. Because output ends of the converters are connected in series, an output voltage to ground of a converter is related to both an output voltage of the converter and an output voltage to ground of another converter in a same photovoltaic string. A BUS voltage is a sum of output voltages of converters in a same photovoltaic string. In other words, an output voltage to ground can directly reflect the BUS voltage, but an output voltage cannot directly reflect the BUS voltage. If a corresponding upper limit value is set for the output voltage to ground of the converter, a maximum value of an output voltage upper limit value of each converter can reach a BUS voltage upper limit value of the photovoltaic string. The optimizer can obtain a larger voltage headroom after the output voltage to ground is set, so that in an abnormal scenario in which a photovoltaic component is blocked, each optimizer in the photovoltaic power generation system can work in an MPPT state. Therefore, the control method for a photovoltaic power generation system in this application can effectively reduce a photovoltaic energy loss in the photovoltaic power generation system.

With reference to specific application scenarios, the control method for a photovoltaic power generation system in this embodiment of this application is specifically described as follows.

Figure 5:
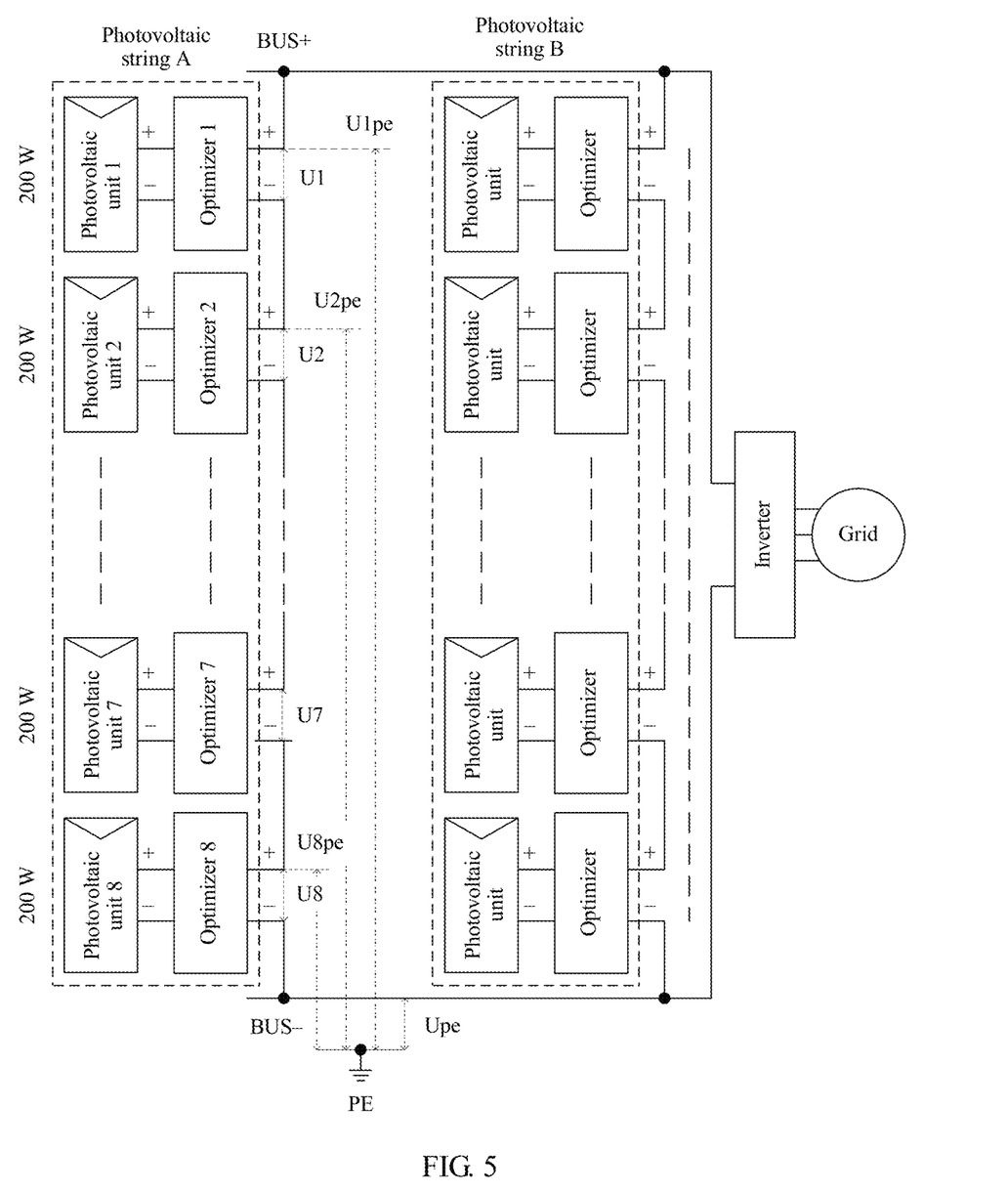
FIG. 5 is a schematic scenario diagram of a photovoltaic power generation system in a normal working scenario.

FIG. 5 is a schematic scenario diagram of a photovoltaic power generation system in a normal working scenario. The photovoltaic power generation system includes a plurality of photovoltaic strings such as a photovoltaic string A and a photovoltaic string B. The following is described by using the string A as an example. Descriptions of another photovoltaic string are similar to those of the photovoltaic string A.

To simplify calculation, the following assumptions are made for the photovoltaic string A shown in FIG. 5: (1) A quantity of photovoltaic modules connected in series in the photovoltaic string A is 8, and a maximum power point of each photovoltaic unit is 200 W; (2) If a conducting wire loss is ignored, conversion efficiency of an optimizer is 100%; and (3) An inverter sets a BUS voltage reference value to 400 V and a BUS voltage upper limit value to 440 V that is less than a system voltage level 600 V.

As shown in FIG. 5, U1 to U8 are respective output voltages of an optimizer 1 to an optimizer 8. U1$pe$ to U8$pe$ are respective output voltages to ground of output voltages of the optimizer 1 to the optimizer 8. Upe is a negative BUS voltage to ground and is a fixed value, and may be determined based on an initial state. PE is a ground reference point of the photovoltaic power generation system, and an electric potential at the point is 0 V.

If an output power of the inverter is not limited and the inverter is normally connected to a grid for power generation, all the optimizers work in an MPPT state, and a BUS voltage remains at the BUS voltage reference value 400 V, an input current of the inverter is as follows: A current Is that is input by the photovoltaic string A to the inverter is obtained based on the following formula 1, where Pn represents a power of an n$^{th}$ photovoltaic component, and Ubus is the BUS voltage:

$$I_S = \frac{\sum_{n=1}^{8} P_n}{U_{bus}}$$

A formula for calculating an output voltage Un of each optimizer is a formula 2 that is shown as follows:

$$U_n = P_n/I_S$$

According to the above, for each optimizer (e.g., the optimizer 1 to the optimizer 8 in the figure) in the photovoltaic string A, an output power is 200 W, an output voltage is 50 V, and a current Is is 4 A.

Thus, from FIG. 5 it can be seen that, the output voltages to ground of the eight optimizers in the photovoltaic string A are respectively as follows:

U1$pe$=Upe+U8+U7+U6+U5+U4+U3+U2+U1, U2$pe$=Upe+U8+U7+U6+U5+U4+U3+U2;

U3$pe$=Upe+U8+U7+U6+U5+U4+U3, U4$pe$=Upe+U8+U7+U6+U5+U4;

U5$pe$=Upe+U8+U7+U6+U5, U6$pe$=Upe+U8+U7+U6; and

U7$pe$=Upe+U8+U7, and U8$pe$=Upe+U8.

Therefore, in the normal working scenario, the output voltages to ground of the optimizer 1 to the optimizer 8 are respectively: 400 V+Upe, 350 V+Upe, 300 V+Upe, 250 V+Upe, 200 V+Upe, 150 V+Upe, 100 V+Upe, and 50 V+Upe.

Because it is assumed that the BUS voltage upper limit value is 440 V, the following setting may be performed. First, output voltage to ground upper limit values of the optimizer 1 to the optimizer 8 may be respectively set to 440 V+Upe, 390 V+Upe, 340 V+Upe, 290 V+Upe, 240 V+Upe, 190 V+Upe, 140 V+Upe, and 90 V+Upe based on a location of each optimizer in the photovoltaic string A and by using a gradient method.

When the output voltage to ground upper limit values of the optimizers are set by using the gradient method, the output voltages to ground of the optimizer 1 to the optimizer 8 are all less than the output voltage to ground upper limit values corresponding to the optimizer 1 to the optimizer 8, and a voltage headroom between the output voltage to ground and the output voltage to ground is approximately 40 V. Therefore, the optimizer 1 to the optimizer 8 in the photovoltaic string A all work in the MPPT state, and there is no photovoltaic energy loss.

Second, output voltage to ground upper limit values of the optimizers are set by using a maximum method, and the output voltage to ground upper limit values of the optimizer 1 to the optimizer 8 may be all set to a maximum value: 440 V+Upe. Similarly, the output voltages to ground of the optimizer 1 to the optimizer 8 are all less than the output voltage to ground upper limit values corresponding to the optimizer 1 to the optimizer 8, and a voltage headroom between the output voltage to ground and the output voltage to ground falls within a range of 40 V to 390 V.

Figure 6:
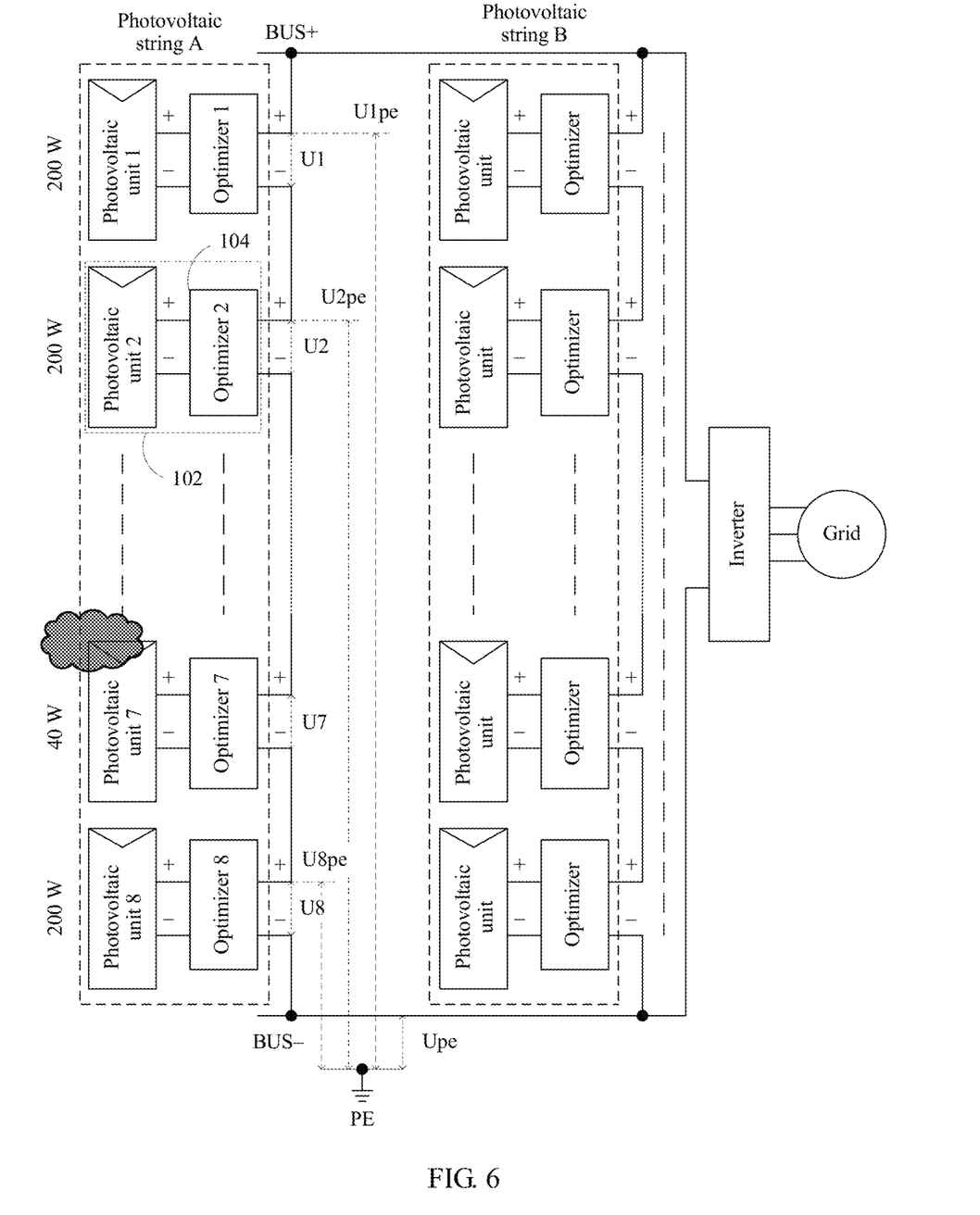
FIG. 6 is a schematic scenario diagram of a photovoltaic power generation system in an abnormal working scenario.

FIG. 6 is a schematic scenario diagram of a photovoltaic power generation system in an abnormal working scenario. The photovoltaic unit 7 in the photovoltaic string A is blocked, and electric energy generated by the photovoltaic unit 7 is reduced. Consequently, an output power of the optimizer 7 is decreased to 40 W. Ideally, the BUS voltage of the inverter remains at the BUS voltage reference value 400 V. It can be learned from the foregoing formula 1 that, in this case, the current Is is decreased from original 4 A to 3.6 A. It can be learned from the foregoing formula 2 that, output voltages of normal optimizers (including the optimizer 1 to the optimizer 6 and the optimizer 8) are increased from 50 V to 55.56 V, and an output voltage of an abnormal optimizer (e.g., the optimizer 7) is decreased from 50 V to 11.11 V.

It can be learned from the foregoing analysis that in the abnormal working scenario, the output voltages to ground of the optimizer 1 to the optimizer 8 are respectively: 400.03 V+Upe, 344.47 V+Upe, 288.91 V+Upe, 233.25 V+Upe, 177.79 V+Upe, 122.23 V+Upe, 66.67 V+Upe, and 55.56 V+Upe. It can be easily learned that, after the photovoltaic unit 7 is blocked, an output voltage to ground upper limit value that is set by using the gradient method and an output voltage to ground upper limit value that is set by using the maximum method each are greater than a corresponding output voltage to ground. Therefore, in the abnormal working scenario, the optimizer 1 to the optimizer 8 in the photovoltaic string A all work in the MPPT state, and there is no photovoltaic energy loss. An output voltage to ground value is entirely adjusted by the photovoltaic string A automatically, without active intervention of the photovoltaic power generation system.

In addition, it should be noted that, in addition to a case in which the photovoltaic unit is blocked, the abnormal working scenario may also: strings in which different quantities of photovoltaic modules are connected in series are connected in parallel, components having different powers in a string are connected in series, some components are removed due to a fault or added after recovery from a fault, an output power of the inverter is limited or the inverter is shut down, and the like. In the foregoing abnormal working scenario, all the optimizers in this application work in the MPPT state. For descriptions of other abnormal working scenarios, refer to the descriptions of the abnormal working scenario in which the photovoltaic unit is blocked. The other abnormal working scenarios are not enumerated one by one herein.

For the photovoltaic power generation system in this application, the output voltage to ground upper limit value is set for each optimizer, and a voltage headroom between the output voltage to ground upper limit value and a normal output voltage to ground is dozens of volts or even hundreds of volts. In a dynamic adjustment process, an actual output voltage to ground of the optimizer does not reach the output voltage to ground upper limit value, and the optimizer does not exit the MPPT state to enter a power limited state. Therefore, in the system, for any scenario in which a photovoltaic component is blocked, faulty, or the like, the entire dynamic adjustment process requires no active intervention of the system, and there is no photovoltaic energy loss.

Further, after the output voltage to ground upper limit value of the optimizer is initially set, any scenario in which a photovoltaic component is blocked, faulty, or the like can be effectively handled, and the output voltage to ground upper limit value may not need to be adjusted through active intervention of the system. Therefore, the output voltage to ground upper limit value of the optimizer only needs to be initially set, and does not need to be dynamically adjusted.

Furthermore, the output voltage to ground upper limit value of the optimizer is directly corresponding to the BUS voltage, and a difference between the two values is only the negative BUS voltage to ground. However, a sum of output voltages of all optimizers in a single string is corresponding to the BUS voltage, and an output voltage of a single optimizer cannot reflect the BUS voltage. Therefore, controlling the output voltage to ground upper limit value of the optimizer is directly controlling the BUS voltage upper limit value.

It may be clearly understood by persons skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions in this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are only intended for describing the technical solutions in this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of this application.

What is claimed is:

1. A photovoltaic power generation control method for a photovoltaic power generation system which comprises at least one photovoltaic string, each photovoltaic string comprising a plurality of photovoltaic modules, each photovoltaic module of the plurality of photovoltaic modules comprising a photovoltaic unit and a converter, the photovoltaic unit and the converter in said each photovoltaic module being connected, and converters in a same photovoltaic string being connected in series, the method comprises:
   presetting, by the photovoltaic power generation system, a plurality of respective upper limit values comprising a respective upper limit value for each converter in a particular photovoltaic string in the photovoltaic power generation system, wherein the respective upper limit value is a maximum voltage value of an output voltage to ground of the each converter, and the output voltage to ground of the each converter is a voltage difference between a positive output end of the each converter and a ground point of the photovoltaic power generation system, wherein the ground point of the photovoltaic power generation system is the same value for said each converter of the photovoltaic system, wherein the plurality of respective upper limit values are set according to either a gradient method or a maximum method, when the plurality of respective upper limit values are set according to the gradient method each said respective upper limit value is a different voltage value and when the plurality of respective upper limit values are set according to the maximum method each said respective upper limit value is a same voltage value between a reference value of a bus voltage and a maximum value of the bus voltage; and
   limiting, by the photovoltaic power generation system, a respective output voltage to ground of the each converter to the preset respective upper limit value corresponding to the each converter,
   wherein said presetting comprises, for said each converter, collecting a voltage difference between a negative output end of the said each converter and the ground point of the power generation system, and performing an addition calculation based on the collected voltage difference and an output voltage of the said each converter to obtain the output voltage to ground of the said each converter.

2. The photovoltaic power generation control method according to claim 1, wherein the upper limit value corresponding to a target converter in the particular photovoltaic string is set by the target converter.

3. The photovoltaic power generation control method according to claim 1, wherein the photovoltaic power generation system further comprises a control device, and the upper limit value corresponding to a target converter in the particular photovoltaic string is centrally set by the control device.

4. The photovoltaic power generation control method according to claim 3, wherein the control device comprises an inverter.

5. The photovoltaic power generation control method according to claim 1, wherein the upper limit value corresponding to a target converter in the particular photovoltaic string is calculated by using the gradient method.

6. The photovoltaic power generation control method according to claim 1, wherein the limiting, by the photovoltaic power generation system, an output voltage to ground of the each converter based on the respective upper limit value corresponding to the each converter comprises:
if the output voltage to ground of a target converter in the particular photovoltaic string is greater than the upper limit value corresponding to the target converter, limiting, by the photovoltaic power generation system, the output voltage to ground of the target converter to the respective upper limit value corresponding to the target converter.

7. The photovoltaic power generation control method according to claim 1, wherein the converter is a direct current/direct current converter, and a topology of the converter comprises:
a buck topology, a boost topology, a buck-boost topology, or a boost-buck topology.

8. The photovoltaic power generation control method according to claim 1, wherein the converter comprises an isolated converter or a non-isolated converter.

9. The photovoltaic power generation control method according to claim 1, further comprising: collecting, by a voltage to ground sampling circuit of a target converter of the photovoltaic power generation system, a voltage difference between the output end of the target converter and the ground point of the photovoltaic power generation system, and wherein the limiting comprises, when the output voltage to ground of the target converter from the collecting is greater than the output voltage to ground upper limit value corresponding to the target converter, the target converter limiting the output voltage to ground of the target converter to the output voltage to ground upper limit value of the target converter.

10. The photovoltaic power generation control method according to claim 1, wherein the upper limit value corresponding to a target converter in the particular photovoltaic string is calculated by using the maximum method.

11. The photovoltaic power generation control method according to claim 10, wherein the upper limit value corresponding to said each converter is set to a bus voltage upper limit value of the photovoltaic string.

12. A photovoltaic power generation system comprising at least one photovoltaic string, wherein each photovoltaic string comprises a plurality of photovoltaic modules, each photovoltaic module of the plurality of photovoltaic modules comprises a photovoltaic unit and a converter, the photovoltaic unit and the converter in said each photovoltaic module are connected, converters in a same photovoltaic string are connected in series, and the photovoltaic power generation system is configured to perform operations comprising:
presetting a plurality of respective upper limit values comprising a respective upper limit value for each converter in a particular photovoltaic string in the photovoltaic power generation system, wherein the respective upper limit value is a maximum voltage value of an output voltage to ground of the each converter, and the output voltage to ground of the converter is a voltage difference between a positive output end of the converter and a ground point of the photovoltaic power generation system, wherein the ground point of the photovoltaic power generation system is the same value for said each converter of the photovoltaic system, wherein the plurality of respective upper limit values are set according to either a gradient method or a maximum method, when the plurality of respective upper limit values are set according to the gradient method each said respective upper limit value is a different voltage value and when the plurality of respective upper limit values are set according to the maximum method each said respective upper limit value is a same voltage value between a reference value of a bus voltage and a maximum value of the bus voltage; and
limiting a respective output voltage to ground of the each converter based onto the preset respective upper limit value corresponding to the each converter,
wherein said presetting comprises, for said each converter, collecting a voltage difference between a negative output end of the said each converter and the ground point of the power generation system, and performing an addition calculation based on the collected voltage difference and an output voltage of the said each converter to obtain the output voltage to ground of the said each converter.

13. The photovoltaic power generation system according to claim 12, wherein each photovoltaic unit comprises at least one photovoltaic component.

14. The photovoltaic power generation system according to claim 12, further comprising a control device, and wherein the photovoltaic power generation system is configured to centrally set, using the control device, the upper limit value corresponding to a target converter in the particular photovoltaic string.

15. A converter comprising a voltage to ground sampling circuit, wherein the voltage to ground sampling circuit is located at an output end of the converter, and is configured to collect a voltage to ground of one of a positive output end of the converter or a negative output end of the converter, and wherein the converter is configured to connect the other of the positive end of the converter or the negative end of the converter to an output end of another converter comprising another voltage to ground sampling circuit, the converter and the another converter being connected to respective power sources, wherein a respective upper limit value is preset for the converter and the another converter, wherein the respective upper limit value is a maximum voltage value of an output voltage to ground of each said converter, and the output voltage to ground of each said converter is a voltage difference between a positive output end of each said converter and a ground point of a photovoltaic power generation system, wherein the respective upper limit values are set according to either a gradient method or a maximum method, when the respective upper limit values are set according to the gradient method each said respective upper limit value is a different voltage value and when the respective upper limit values are set according to the maximum method each said respective upper limit value is a same voltage value between a reference value of a bus voltage and a maximum value of the bus voltage, wherein the output voltage to ground of the converter is limited to the preset upper limit value,     wherein said presetting comprises, for said each converter, collecting a voltage difference between a negative output end of the said each converter and the ground point of the power generation system, and performing an addition calculation based on the collected voltage difference and an output voltage of the said each converter to obtain the output voltage to ground of the said each converter.

* * * * *